US011664836B2

(12) United States Patent
Huang et al.

(10) Patent No.: US 11,664,836 B2
(45) Date of Patent: *May 30, 2023

(54) PASSIVE INTERMODULATION CANCELLATION (71) Applicant: NanoSemi, Inc., Waltham, MA (US)

(72) Inventors: Yanyu Huang, Bedford, MA (US); Zohaib Mahmood, Westwood, MA (US); Yan Li, Lexington, MA (US); Alexandre Megretski, Concord, MA (US); Helen H. Kim, Sudbury, MA (US)

(73) Assignee: NanoSemi, Inc., Waltham, MA (US)

( * ) Notice: Subject to any disclaimer, the term of this patent is extended or adjusted under 35 U.S.C. 154(b) by 580 days.

This patent is subject to a terminal disclaimer.

(21) Appl. No.: 16/614,534

(22) PCT Filed: May 17, 2018

(86) PCT No.: PCT/US2018/033158
§ 371 (c)(1),
(2) Date: Nov. 18, 2019

(87) PCT Pub. No.: WO2018/213558
PCT Pub. Date: Nov. 22, 2018

(65) Prior Publication Data
US 2020/0177229 A1    Jun. 4, 2020

Related U.S. Application Data (63) Continuation of application No. 15/598,613, filed on May 18, 2017, now Pat. No. 10,141,961.

(51) Int. Cl.
H04W 88/02      (2009.01)
H04B 1/10       (2006.01)
(Continued)

(52) U.S. Cl.
CPC ............. *H04B 1/10* (2013.01); *H04B 1/0475* (2013.01); *H04B 1/12* (2013.01); *H04B 1/525* (2013.01);
(Continued)

(58) Field of Classification Search
CPC ............... H04W 88/06; H04W 52/367; H04W 72/0453; H04W 52/52; H04W 72/082;
(Continued)

(56) References Cited

U.S. PATENT DOCUMENTS 4,979,126 A    12/1990  Pao et al.
5,819,165 A    10/1998  Hulkko et al.
(Continued)

FOREIGN PATENT DOCUMENTS

CN    1938939 A       3/2007
CN    101379718 A     3/2009
(Continued)

OTHER PUBLICATIONS

Henrie, Justin, Andrew Christianson, and William J. Chappell. "Cancellation of passive intermodulation distortion in microwave networks." In Microwave Conference, 2008. EuMC 2008. 38th European, pp. 1153-1156. IEEE, 2008.
(Continued)

*Primary Examiner* — Eva Y Puente
(74) *Attorney, Agent, or Firm* — Occhiuti & Rohlicek LLP (57) ABSTRACT A received signal is enhanced by removing distortion components of a concurrently transmitted signal. A received signal is acquired in a receive frequency band concurrently with transmission of a transmit signal in a transmit frequency band. The received signal includes an intermodulation distortion component of the transmit signal. A representation of the transmit signal is processed using a non-
(Continued)

linear predictor to output a distortion signal representing predicted distortion components in the received signal. The received signal is enhanced using the distortion signal by removing the predicted distortion components from the received signal corresponding to the distortion signal.

22 Claims, 5 Drawing Sheets

(51) Int. Cl.
   *H04B 1/525* (2015.01)
   *H04B 1/12* (2006.01)
   *H04L 5/14* (2006.01)
   *H04B 1/04* (2006.01)
   *H04L 7/00* (2006.01)

(52) U.S. Cl.
   CPC .......... *H04L 5/1423* (2013.01); *H04L 7/0087* (2013.01); *H04W 88/02* (2013.01)

(58) Field of Classification Search
   CPC ... H04W 52/146; H04W 24/08; H04W 24/02; H03F 1/3247; H03F 1/3229; H03F 2200/451; H03F 3/245; H03F 1/32; H03F 1/3205; H03F 1/3241; H03F 1/3223; H03F 3/24; H04B 1/0475; H04B 1/0064; H04B 1/0067; H04B 2001/0425; H04B 1/0007
   USPC .......................................................... 375/219
   See application file for complete search history.

(56) References Cited

U.S. PATENT DOCUMENTS

| | | |
|---|---|---|
| 5,980,457 A | 11/1999 | Averkiou |
| 6,052,412 A | 4/2000 | Ruether et al. |
| 6,240,278 B1 | 5/2001 | Midya et al. |
| 6,288,610 B1 | 9/2001 | Miyashita |
| 6,549,067 B1 | 4/2003 | Kenington |
| 7,142,615 B2 | 11/2006 | Hongo et al. |
| 7,170,344 B2 | 1/2007 | Suzuki et al. |
| 7,289,773 B2 | 10/2007 | Braithwaite |
| 7,295,815 B1 | 11/2007 | Wright et al. |
| 7,321,264 B2 | 1/2008 | Kokkeler |
| 7,333,557 B2 | 2/2008 | Rashev et al. |
| 7,469,491 B2 | 12/2008 | McCallister et al. |
| 7,529,652 B1 | 5/2009 | Gahinet et al. |
| 7,577,211 B2 | 8/2009 | Braithwaite |
| 7,599,431 B1 | 10/2009 | Anderson et al. |
| 7,634,238 B2 | 12/2009 | Suzuki et al. |
| 7,796,960 B1 | 9/2010 | Rashev et al. |
| 7,904,033 B1 | 3/2011 | Wright et al. |
| 8,121,560 B1 | 2/2012 | Anaraki et al. |
| 8,185,066 B2 | 5/2012 | Camp, Jr. et al. |
| 8,306,149 B2 | 11/2012 | Mujica et al. |
| 8,391,809 B1 | 3/2013 | Fuller |
| 8,411,730 B2 | 4/2013 | Maeda |
| 8,446,979 B1 | 5/2013 | Yee |
| 8,498,590 B1 | 7/2013 | Rashev et al. |
| 8,519,789 B2 | 8/2013 | Hawkes |
| 8,576,941 B2 | 11/2013 | Bai |
| 8,644,437 B2 | 2/2014 | Kim et al. |
| 8,666,336 B1 | 3/2014 | Dick |
| 8,711,976 B2 | 4/2014 | Chandrasekaran |
| 8,731,005 B2 | 5/2014 | Schlee |
| 8,731,105 B2 | 5/2014 | Bai |
| 8,890,609 B2 | 11/2014 | Laporte |
| 9,071,207 B2 | 6/2015 | Bai |
| 9,130,628 B1 | 9/2015 | Mittal et al. |
| 9,173,173 B2 | 10/2015 | Wei et al. |
| 9,184,710 B2 | 11/2015 | Braithwaite |
| 9,226,189 B1 | 12/2015 | Kularatna et al. |
| 9,252,712 B2 | 2/2016 | Li et al. |
| 9,331,882 B2 | 5/2016 | Fehri et al. |
| 9,337,782 B1 | 5/2016 | Mauer et al. |
| 9,467,954 B2 | 10/2016 | Cao et al. |
| 9,509,350 B1 | 11/2016 | Magesacher et al. |
| 9,564,876 B2 | 2/2017 | Kim et al. |
| 9,590,668 B1 | 3/2017 | Kim et al. |
| 9,595,920 B2 | 3/2017 | Li et al. |
| 9,614,557 B1 | 4/2017 | Mayer et al. |
| 9,621,236 B2 | 4/2017 | Ghannouchi et al. |
| 9,628,119 B2 | 4/2017 | Gal et al. |
| 9,628,120 B2 | 4/2017 | Yu et al. |
| 9,722,646 B1 | 8/2017 | Matthews et al. |
| 9,749,161 B1 | 8/2017 | Gal et al. |
| 9,768,812 B1* | 9/2017 | Tsui ................. H04B 17/0085 |
| 9,831,899 B1 | 11/2017 | Boghrat et al. |
| 9,935,810 B1 | 4/2018 | Hammler et al. |
| 9,973,370 B1 | 5/2018 | Langer et al. |
| 10,033,413 B2 | 7/2018 | Pratt |
| 10,033,414 B2 | 7/2018 | Ota |
| 10,079,699 B1 | 9/2018 | Li et al. |
| 10,080,178 B2 | 9/2018 | Stapleton et al. |
| 10,141,896 B2 | 11/2018 | Huang |
| 10,141,961 B1 | 11/2018 | Huang et al. |
| 10,181,914 B2 | 1/2019 | Li et al. |
| 10,230,550 B2* | 3/2019 | Al-Mufti ................. H04L 25/03 |
| 10,404,296 B2 | 9/2019 | Kim et al. |
| 10,447,511 B2 | 10/2019 | Xie et al. |
| 10,469,109 B2 | 11/2019 | Gutman et al. |
| 10,523,159 B2 | 12/2019 | Megretski et al. |
| 10,581,470 B2 | 3/2020 | Megretski et al. |
| 10,623,118 B2 | 4/2020 | Lagoy et al. |
| 10,644,657 B1 | 5/2020 | Megretski et al. |
| 10,763,904 B2 | 9/2020 | Megretski et al. |
| 10,812,166 B2 | 10/2020 | Kim et al. |
| 10,826,739 B1 | 11/2020 | Fomin et al. |
| 2001/0050592 A1 | 12/2001 | Wright et al. |
| 2002/0080891 A1 | 6/2002 | Ahn et al. |
| 2003/0058960 A1 | 3/2003 | Lee |
| 2003/0184374 A1 | 10/2003 | Huang et al. |
| 2003/0207680 A1 | 11/2003 | Yang et al. |
| 2004/0076247 A1 | 4/2004 | Barak et al. |
| 2004/0116083 A1 | 6/2004 | Suzuki et al. |
| 2004/0121741 A1 | 6/2004 | Rashev et al. |
| 2004/0142667 A1 | 7/2004 | Lochhead et al. |
| 2004/0196922 A1 | 10/2004 | Leffel |
| 2005/0001684 A1 | 1/2005 | Braithwaite |
| 2005/0163251 A1 | 7/2005 | McCallister |
| 2005/0163252 A1 | 7/2005 | McCallister et al. |
| 2005/0163268 A1 | 7/2005 | McCallister |
| 2005/0180527 A1 | 8/2005 | Suzuki et al. |
| 2005/0190857 A1 | 9/2005 | Braithwaite |
| 2006/0022751 A1 | 2/2006 | Fuller et al. |
| 2006/0078065 A1* | 4/2006 | Cai ................. H04L 25/03885 375/297 |
| 2006/0154622 A1 | 7/2006 | Piirainen |
| 2006/0229036 A1 | 10/2006 | Muller et al. |
| 2006/0276147 A1 | 12/2006 | Suzuki |
| 2007/0091992 A1 | 4/2007 | Dowling |
| 2007/0230557 A1 | 10/2007 | Balasubramonian et al. |
| 2007/0241812 A1 | 10/2007 | Yang et al. |
| 2008/0003945 A1 | 1/2008 | Wenham |
| 2008/0019453 A1 | 1/2008 | Zhao et al. |
| 2008/0039045 A1 | 2/2008 | Filipovic et al. |
| 2008/0049868 A1 | 2/2008 | Brobston |
| 2008/0057882 A1 | 3/2008 | Singerl |
| 2008/0085684 A1 | 4/2008 | Phillips et al. |
| 2008/0101502 A1 | 5/2008 | Navidpour et al. |
| 2008/0247487 A1 | 10/2008 | Cai et al. |
| 2008/0260066 A1 | 10/2008 | Cai et al. |
| 2008/0268794 A1 | 10/2008 | Mege et al. |
| 2008/0268795 A1 | 10/2008 | Saed |
| 2008/0285640 A1 | 11/2008 | McCallister |
| 2009/0201084 A1 | 8/2009 | See et al. |
| 2010/0019983 A1 | 1/2010 | Bonnet et al. |
| 2010/0026354 A1 | 2/2010 | Utsunomiya et al. |
| 2010/0048149 A1 | 2/2010 | Tang et al. |
| 2010/0225390 A1 | 9/2010 | Brown et al. |
| 2010/0297966 A1 | 11/2010 | Row et al. |

(56) References Cited

U.S. PATENT DOCUMENTS

| | | |
|---|---|---|
| 2011/0044158 A1 | 2/2011 | Tao et al. |
| 2011/0085490 A1 | 4/2011 | Schlee |
| 2011/0098011 A1 | 4/2011 | Camp, Jr. et al. |
| 2011/0128992 A1 | 6/2011 | Maeda et al. |
| 2011/0135035 A1 | 6/2011 | Bose et al. |
| 2011/0150130 A1 | 6/2011 | Kenington |
| 2011/0156815 A1 | 6/2011 | Kim et al. |
| 2011/0163806 A1 | 7/2011 | Hongo |
| 2011/0187437 A1 | 8/2011 | Perreault et al. |
| 2011/0235734 A1 | 9/2011 | Kenington |
| 2011/0255627 A1 | 10/2011 | Gotman et al. |
| 2011/0273234 A1 | 11/2011 | Van der Heijen et al. |
| 2011/0273236 A1 | 11/2011 | Heijden et al. |
| 2012/0093210 A1 | 4/2012 | Schmidt et al. |
| 2012/0108189 A1 | 5/2012 | McCallister et al. |
| 2012/0119810 A1 | 5/2012 | Bai |
| 2012/0119811 A1 | 5/2012 | Bai et al. |
| 2012/0119831 A1 | 5/2012 | Bai |
| 2012/0147993 A1 | 6/2012 | Kim et al. |
| 2012/0154033 A1 | 6/2012 | Lozhkin |
| 2012/0154430 A1 | 6/2012 | Matsushima et al. |
| 2012/0176195 A1 | 7/2012 | Dawson et al. |
| 2012/0194271 A1 | 8/2012 | Yamamoto et al. |
| 2012/0199810 A1 | 8/2012 | Lee |
| 2012/0200355 A1 | 8/2012 | Braithwaite |
| 2012/0219048 A1 | 8/2012 | Camuffo et al. |
| 2012/0286865 A1 | 11/2012 | Chandrasekaran |
| 2012/0286985 A1 | 11/2012 | Chandrasekaran et al. |
| 2012/0293252 A1 | 11/2012 | Sorrells et al. |
| 2012/0295558 A1 | 11/2012 | Wang et al. |
| 2013/0033317 A1 | 2/2013 | Hawkes |
| 2013/0034188 A1 | 2/2013 | Rashev et al. |
| 2013/0044791 A1 | 2/2013 | Rimini et al. |
| 2013/0064325 A1 | 3/2013 | Kilambi et al. |
| 2013/0094610 A1 | 4/2013 | Ghannouchi et al. |
| 2013/0094612 A1 | 4/2013 | Kim et al. |
| 2013/0163512 A1 | 6/2013 | Rexberg et al. |
| 2013/0243121 A1 | 9/2013 | Bai |
| 2013/0251065 A1 | 9/2013 | Bai |
| 2013/0259159 A1 | 10/2013 | McCallister et al. |
| 2013/0329833 A1 | 12/2013 | Bai |
| 2014/0009225 A1 | 1/2014 | Laporte |
| 2014/0016725 A1 | 1/2014 | Peroulas et al. |
| 2014/0038659 A1 | 2/2014 | Wei et al. |
| 2014/0044155 A1* | 2/2014 | Honcharenko ...... H04B 1/0007 375/295 |
| 2014/0139286 A1 | 5/2014 | Laporte |
| 2014/0161159 A1 | 6/2014 | Black et al. |
| 2014/0161207 A1 | 6/2014 | Teterwak |
| 2014/0177695 A1 | 6/2014 | Cha et al. |
| 2014/0187182 A1 | 7/2014 | Yan et al. |
| 2014/0254716 A1 | 9/2014 | Zhou et al. |
| 2014/0274105 A1 | 9/2014 | Wang |
| 2014/0292579 A1 | 10/2014 | Oh et al. |
| 2014/0347126 A1 | 11/2014 | Laporte et al. |
| 2015/0043313 A1 | 2/2015 | Stranczl et al. |
| 2015/0043323 A1 | 2/2015 | Choi et al. |
| 2015/0043678 A1 | 2/2015 | Hammi |
| 2015/0049841 A1 | 2/2015 | Laporte et al. |
| 2015/0061761 A1 | 3/2015 | Wills et al. |
| 2015/0103952 A1 | 4/2015 | Wang et al. |
| 2015/0123735 A1 | 5/2015 | Wimpenny |
| 2015/0124907 A1 | 5/2015 | Li et al. |
| 2015/0171768 A1 | 6/2015 | Perreault |
| 2015/0325913 A1 | 11/2015 | Vagman |
| 2015/0326349 A1 | 11/2015 | Yang et al. |
| 2015/0333711 A1 | 11/2015 | Langer |
| 2015/0333781 A1 | 11/2015 | Alon et al. |
| 2015/0357975 A1 | 12/2015 | Avniel et al. |
| 2015/0358039 A1 | 12/2015 | Xiong et al. |
| 2015/0358047 A1* | 12/2015 | Sarrigeorgidis ....... H04B 1/123 455/78 |
| 2015/0372745 A1 | 12/2015 | Abe |
| 2015/0381216 A1 | 12/2015 | Shor et al. |
| 2015/0381220 A1 | 12/2015 | Gal et al. |
| 2016/0013820 A1 | 1/2016 | Yamanouchi |
| 2016/0028433 A1 | 1/2016 | Ding et al. |
| 2016/0034421 A1 | 2/2016 | Magesacher et al. |
| 2016/0043753 A1 | 2/2016 | Jungnickel et al. |
| 2016/0065147 A1 | 3/2016 | Pratt et al. |
| 2016/0087604 A1 | 3/2016 | Kim et al. |
| 2016/0094253 A1 | 3/2016 | Weber et al. |
| 2016/0095110 A1 | 3/2016 | Li et al. |
| 2016/0100180 A1 | 4/2016 | Oh |
| 2016/0112222 A1 | 4/2016 | Pashay-Kojouri et al. |
| 2016/0174118 A1 | 6/2016 | Duan et al. |
| 2016/0191020 A1 | 6/2016 | Velazquez |
| 2016/0211577 A1 | 7/2016 | Miller et al. |
| 2016/0218891 A1 | 7/2016 | Nammi et al. |
| 2016/0241277 A1 | 8/2016 | Rexberg et al. |
| 2016/0249003 A1 | 8/2016 | Tsai et al. |
| 2016/0285485 A1 | 9/2016 | Fehri et al. |
| 2016/0308577 A1 | 10/2016 | Molina et al. |
| 2016/0336906 A1 | 11/2016 | Lee et al. |
| 2016/0373072 A1 | 12/2016 | Magesacher et al. |
| 2017/0005627 A1 | 1/2017 | Zhao et al. |
| 2017/0033969 A1 | 2/2017 | Yang et al. |
| 2017/0041124 A1 | 2/2017 | Khandani |
| 2017/0047899 A1 | 2/2017 | Abdelrahman et al. |
| 2017/0077981 A1* | 3/2017 | Tobisu ................ H04B 1/0475 |
| 2017/0176507 A1 | 6/2017 | O'Keeffe et al. |
| 2017/0201275 A1 | 7/2017 | Tabatabai et al. |
| 2017/0214438 A1 | 7/2017 | Ghannouchi et al. |
| 2017/0237455 A1 | 8/2017 | Ye et al. |
| 2017/0244582 A1 | 8/2017 | Gal et al. |
| 2017/0302233 A1 | 10/2017 | Huang |
| 2017/0338841 A1 | 11/2017 | Pratt |
| 2018/0097530 A1 | 4/2018 | Yang et al. |
| 2018/0159568 A1 | 6/2018 | Matsuura et al. |
| 2018/0167092 A1 | 6/2018 | Hausmair et al. |
| 2018/0191537 A1 | 7/2018 | Xiong et al. |
| 2018/0227925 A1* | 8/2018 | Gebhard ................ H04L 5/143 |
| 2018/0287569 A1 | 10/2018 | Xu et al. |
| 2018/0294894 A1* | 10/2018 | Matsubara ............ H04B 1/109 |
| 2018/0337700 A1 | 11/2018 | Huang et al. |
| 2019/0007075 A1 | 1/2019 | Kim et al. |
| 2019/0097662 A1 | 3/2019 | Hornbuckle et al. |
| 2019/0104000 A1 | 4/2019 | Xie et al. |
| 2019/0238204 A1 | 8/2019 | Kim et al. |
| 2019/0260401 A1 | 8/2019 | Megretski et al. |
| 2019/0260402 A1 | 8/2019 | Chuang et al. |
| 2019/0348956 A1 | 11/2019 | Megretski et al. |
| 2019/0363676 A1 | 11/2019 | Megretski et al. |
| 2019/0363742 A1 | 11/2019 | Megretski et al. |
| 2020/0028476 A1 | 1/2020 | Kim et al. |
| 2020/0067543 A1 | 2/2020 | Kim et al. |
| 2020/0119755 A1 | 4/2020 | Mahmood et al. |

FOREIGN PATENT DOCUMENTS

| | | |
|---|---|---|
| CN | 101971507 A | 2/2011 |
| CN | 103201949 A | 7/2013 |
| CN | 104796170 A | 7/2015 |
| CN | 104871433 A | 8/2015 |
| CN | 105634539 A | 6/2016 |
| CN | 106464280 A | 2/2017 |
| EP | 0916967 A2 | 5/1999 |
| EP | 1560329 A1 | 8/2005 |
| EP | 1732208 A1 | 12/2006 |
| EP | 2991221 A1 | 3/2016 |
| JP | 2005-065211 A | 3/2005 |
| JP | 2010-136123 A | 6/2010 |
| JP | 4813995 B2 | 11/2011 |
| JP | 2013-542696 A | 11/2013 |
| JP | 2014-533017 A | 12/2014 |
| KR | 20100040497 A | 4/2010 |
| WO | 20120154430 A1 | 11/2012 |
| WO | 2015107392 A1 | 7/2015 |
| WO | 2018156932 A1 | 8/2018 |
| WO | 2018227093 A1 | 12/2018 |
| WO | 2018227111 A1 | 12/2018 |
| WO | 2019/014422 A1 | 1/2019 |
| WO | 2019031714 A1 | 2/2019 |

(56) References Cited

FOREIGN PATENT DOCUMENTS

| WO | 2019070573 A1 | 4/2019 |
|---|---|---|
| WO | 2019094713 A1 | 5/2019 |
| WO | 2019094720 A1 | 5/2019 |

OTHER PUBLICATIONS

Riihonen et al., "Mitigation of Loopback Self-Interference in Full-Duplex Mimo Relays" IEEE Transactions on Signal Processing, 59(12), 5983-5993, Dec. 2011.
Aguirre, et al., "On the Interpretation and Practice of Dynamical Differences Between Hammerstein and Wiener Models", IEEE Proceedings on Control TheoryAppl; vol. 152, No. 4, Jul. 2005, pp. 349-356.
Barradas, et al. "Polynomials and LUTs in PA Behavioral Modeling: A Fair Theoretical Comparison", IEEE Transactions on Microwave Theory and Techniques; vol. 62, No. 12, Dec. 2014, pp. 3274-3285.
Bosch et al. "Measurement and Simulation of Memory Effects in Predistortion Linearizers," IEEE Transactions on Mircrowave Theory and Techniques; vol. 37.No. 12; Dec. 1989, pp. 1885-1890.
Braithwaite, et al. "Closed-Loop Digital Predistortion (DPD) Using an Observation Path with Limited Bandwidth" IEEE Transactions on Microwave Theory and Techniques; vol. 63, No. 2; Feb. 2015, pp. 726-736.
Cavers, "Amplifier Linearization Using a Digital Predistorter with Fast Adaption and Low Memory Requirements;" IEEE Transactions on Vehicular Technology; vol. 39; No. 4; Nov. 1990, pp. 374-382.
D'Andrea et al., "Nonlinear Predistortion of OFDM Signals over Frequency-Selective Fading Channels," IEEE Transactions on Communications; vol. 49; No. 5, May 2001; pp. 837-843.
Guan, et al. "Optimized Low-Complexity Implementation of Least Squares Based Model Extraction of Digital Predistortion of RF Power Amplifiers", IEEE Transactions on Microwave Theory and Techniques; vol. 60, No. 3, Mar. 2012; pp. 594-603. cited byapplicant.
Henrie, et al., "Cancellation of Passive Intermodulation Distortion in Microwave Networks", Proceedings of the 38.sup.th European Microwave Conference, Oct. 2008, Amsterdam, The Netherlands, pp. 1153-1156.
Hong et al., "Weighted Polynomial Digital Predistortion for Low Memory Effect Doherty Power Amplifier," IEEE Transactions on Microwave Theory and Techniques; vol. 55; No. 5, May 2007, pp. 925-931.
Kwan, et al., "Concurrent Multi-Band Envelope Modulated Power Amplifier Linearized Using Extended Phase-Aligned DPD", IEEE Transactions on Microwave Theory and Techniques; vol. 62, No. 12, Dec. 2014, pp. 3298-3308.
Lajoinie et al. Efficient Simulation of NPR for the Optimum Design of Satellite Transponders SSPAs, EEE MTT-S International; vol. 2; Jun. 1998; pp. 741-744.
Li et al. "High-Throughput Signal Component Separator for Asymmetric Multi-Level Outphasing Power Amplifiers," IEEE Journal of Solid-State Circuits; vol. 48; No. 2; Feb. 2013; pp. 369-380.
Liang, et al. "A Quadratic-Interpolated Lut-Based Digital Predistortion Techniques for Cellular Power Amplifiers", IEEE Transactions on Circuits and Systems; II: Express Briefs, vol. 61, No. 3, Mar. 2014; pp. 133-137.
Liu, et al. "Digital Predistortion for Concurrent Dual-Band Transmitters Using 2-D Modified Memory Polynomials", IEEE Transactions on Microwave Theory and Techniques, vol. 61, No. 1, Jan. 2013, pp. 281-290.
Molina, et al. "Digital Predistortion Using Lookup Tables with Linear Interpolation and Extrapolation: Direct Least Squares Coefficient Adaptation", IEEE Transactions on Microwave Theory and Techniques, vol. 65, No. 3, Mar. 2017; pp. 980-987.
Morgan, et al. "A Generalized Memory Polynomial Model for Digital Predistortion of RF Power Amplifiers," IEEE Transactions of Signal Processing; vol. 54; No. 10; Oct. 2006; pp. 3852-3860.

Muta et al., "Adaptive predistortion linearization based on orthogonal polynomial expansion for nonlinear power amplifiers in OFDM systems", Communications and Signal Processing (ICCP), International Conference on, IEEE, pp. 512-516, 2011.
Naraharisetti, et a., "2D Cubic Spline Implementation for Concurrent Dual-Band System", IEEE, 2013, pp. 1-4.
Naraharisetti, et al. "Efficient Least-Squares 2-D-Cubic Spline for Concurrent Dual-Band Systems", IEEE Transactions an Microwave Theory and Techniques, vol. 63; No. 7, Jul. 2015; pp. 2199-2210.
Panigada, et al. "A 130 mW 100 MS/s Pipelined ADC with 69 SNDR Enabled by Digital Harmonic Distortion Correction," IEEE Journal of Solid-State Circuits; vol. 44; No. 12; Dec. 2009, pp. 3314-3328.
Peng, et al. "Digital Predistortion for Power Amplifier Based on Sparse Bayesian Learning", IEEE Transactions on Circuits and Systems, II: Express Briefs; 2015, pp. 1-5.
Quindroit et al. "FPGA Implementation of Orthogonal 2D Digital Predistortion System for Concurrent Dual-Band Power Amplifiers Based on Time-Division Multiplexing", IEEE Transactions on Microwave Theory and Techniques; vol. 61; No. 12, Dec. 2013, pp. 4591-4599.
Rawat, et al. "Adaptive Digital Predistortion of Wireless Power Amplifiers/Transmitters Using Dynamic Real-Valued Focused Time-Delay Line Neural Networks", IEEE Transactions on Microwave Theory and Techniques; vol. 58, No. 1; Jan. 2010; pp. 95-104.
Safari, et al. "Spline-Based Model for Digital Predistortion of Wide-Band Signals for High Power Amplifier Linearization", IEEE; 2007, pp. 1441-1444.
Sevic, et al. "A Novel Envelope-Termination Load-Pull Method of ACPR Optimization of RF/Microwave Power Amplifiers," IEEE MTT-S International; vol. 2, Jun. 1998; pp. 723-726.
Tai, "Efficient Watt-Level Power Amplifiers in Deeply Scaled CMOS," Ph D. Dissertation; Carnegie Mellon University; May 2011; 129 pages.
Tehran, et al. "Modeling of Long Term Memory Effects in RF Power Amplifiers with Dynamic Parameters", IEEE; 2012, pp. 1-3.
Yu et al. "A Generalized Model Based on Canonical Piecewise Linear Functions for Digital Predistortion", Proceedings of the Asia-Pacific Microwave Conference; 2016, pp. 1-4.
Yu, et al. "Band-Limited Volterra Series-Based Digital Predistortion for Wideband RF Power Amplifiers," IEEE Transactions of Microwave Theory and Techniques; vol. 60; No. 12; Dec. 2012, pp. 4198-4208.
Yu, et al. "Digital Predistortion Using Adaptive Basis Functions", IEEE Transations on Circuits and Systems—I. Regular Papers; vol. 60, No. 12; Dec. 2013, pp. 3317-3327.
Zhang et al. "Linearity Performance of Outphasing Power Amplifier Systems," Design of Linear Outphasing Power Amplifiers; Google e-book; 2003; Retrieved on Jun. 13, 2014; Retrieved from Internet <URL:http:www.artechhouse.com/uploads/public/documents/chapters/Zhang-LarsonCH-2.pdf; pp. 35-85.
Zhu et al. "Digital Predistortion for Envelope-Tracking Power Amplifiers Using Decomposed Piecewise Volterra Sereis," IEEE Transactions on Microwave Theory and Techniques; vol. 56; No. 10; Oct. 2008; pp. 2237-2247.
Cidronali, A., I. Magrini, R. Fagotti, and G. Manes. "A new approach for concurrent dual-band IF digital predistortion: System design and analysis." In 2008 Workshop on Integrated Nonlinear Microwave and Millimetre-Wave Circuits, pp. 127-130. IEEE, 2008.
Liu Youjiang et al.: Concurrent Dual-Band Digital Predistortion with a Single Feedback Loop:, IEEE Transactions on Microwave Theory and Techniques, Plenum, USA, vol. 63, No. 5, May 1, 2015 (May 1, 2015), pp. 1556-1568, XP011580127, ISSN: 0018-9480, DOI: 10.1109/TMTT.2015.2417158.
Cheng, Sheng-Lung, Wen-Rong Wu, Chun-Hsien Peng, Chen-Jui Hsu, and Paul Liang. "Digital predistortion for concurrent dual-band transmitter using a 2D LUT based method." In 2015 IEEE 16th Annual Wireless and Microwave Technology Conference (WAMICON), pp. 1-4. IEEE, 2015.
International Search Report and Written Opinion, PCT Application No. PCT/US2018/033158, dated Jul. 23, 2018 (11 pages).

(56) References Cited

OTHER PUBLICATIONS

R.N. Braithwaite, "Implementing crest factor reduction (CFR) by offsetting digital predistortion (DPD) coefficients," 2012 Workshop on Integrated Nonlinear Microwave and Millimetre-wave Circuits, Dublin, 2012, pp. 1-3, doi: 10.1109/INMMIC.2012.6331928. (Year: 2012).

* cited by examiner

PASSIVE INTERMODULATION CANCELLATION

CROSS-REFERENCE TO RELATED APPLICATIONS

This application claims the benefit of U.S. application Ser. No. 15/598,613, filed May 18, 2017, the contents of which are incorporated by reference.

BACKGROUND

This invention relates to enhancement of a received signal to remove distortion components of a transmitted signal, and more particularly to cancellation of intermodulation distortion in a radio-frequency transceiver.

Some communication systems provide the capability of transmitting and receiving at the same time. In radio frequency communication, a transceiver may transmit in one radio frequency band while receiving in another radio frequency band. Some such systems are referred to as frequency-division duplex (FDD) systems. When the two bands are sufficiently separated in frequency, the transmitted signal may not interfere significantly with the received signal. However, in part due to non-linear characteristics of circuit components in the transmit and receive paths and/or coupling of those paths, some of the transmitted signal may nevertheless "leak" into the received signal. Although the level of such leakage may be low, the error rate of information decoded from the received signal may be adversely affected. There is therefore a need to mitigate the effect of such leakage to improve characteristics of the communication system.

One approach to dealing with non-linearities in a transmitter, for example resulting from non-linear characteristics of a power amplifier, is to predistort a transmission signal. Although such predistortion may mitigate some of the leakage between the transmitted signal and the received signal, there is a need for further mitigation of the effect of the leakage.

SUMMARY

In one aspect, in general, a received signal is enhanced by removing distortion components of a concurrently transmitted signal. The received signal is acquired in a receive frequency band concurrently with transmission of a transmit signal in a transmit frequency band. The received signal includes a distortion component of the transmit signal. A representation of the transmit signal is processed using a non-linear predictor to output a distortion signal representing predicted distortion components in the received signal. The received signal is enhanced using the distortion signal by removing the predicted distortion components from the received signal corresponding to the distortion signal.

In another aspect, in general, a received signal is enhanced by removing distortion components of a concurrently transmitted signal. A reference signal corresponding to a transmit signal transmitted in a radio frequency transmission band is received. A received signal received via receiving circuitry having been acquired in a receive frequency band concurrently with transmission of the transmit signal in the transmit frequency band. The received signal includes a distortion component of the transmit signal. The transmit frequency band and the receive frequency band are non-overlapping bands. The reference signal is upsampled to yield an upsampled reference signal, and the received signal is upsampled to yield an upsampled received signal. The upsampled reference signal and the upsampled received signal have a same sampling rate. A relative frequency between the upsampled reference signal and the upsampled received signal matches a relative frequency between the transmit frequency band and the receive frequency band. The upsampled reference signal is passed to a configurable predictor configured with predictor parameters. The configurable predictor provides an upsampled distortion signal determined from the upsampled reference signal as input. The upsampled distortion signal is downsampled to yield a distortion signal. The received signal is enhanced using the distortion signal by removing components from the received signal corresponding to the distortion signal. The upsampled distortion signal and the upsampled received signal are correlated to determine a relative delay. Upsampling the transmit signal includes synchronizing the upsampled reference signal according to the relative delay. The parameters for the predictor are estimated using the upsampled reference signal and the upsampled received signal.

In another aspect, in general, a received signal is enhanced by removing distortion components of a concurrently transmitted signal. The received signal is acquired in a reception frequency band concurrently with transmission of a transmit signal in a transmission frequency band. The received signal includes a distortion component of the transmit signal. A reference signal representing the transmit signal is processed using a non-linear predictor to output a distortion signal comprising a predicted distortion component corresponding to the transmit signal. The received signal is enhanced to yield an enhanced received signal using the distortion signal by removing at least some of the distortion components of the transmit signal from the received signal according to the predicted distortion component. The enhanced received signal is provided, for example, for further processing of information encoded in the received signal.

Aspects may include one or more of the following features.

The reference signal is provided for causing transmission of the transmit signal in the transmit frequency band via transmission circuitry.

The received signal is received via first receiving circuitry that is coupled to or that shares elements with the transmission circuitry. For instance, the transmission circuitry and the first receiving circuitry share passive elements, which may introduce non-linear distortion components (e.g., intermodulation components) of the transmit signal into the received signal.

The reference signal is received via second receiving circuitry based on a propagation of the transmit signal, for example, from a distant transmitter.

The reference signal is upsampled to yield an upsampled transmit signal at an upsampled sampling rate such that the transmit frequency band corresponds to an upsampled transmit band in the upsampled transmit signal.

The upsampled transmit signal is passed to a configurable predictor configured with predictor parameters. The configurable predictor provides an upsampled distortion signal determined from the upsampled transmit signal as input.

The upsampled distortion signal is downsampled to yield the distortion signal retaining a part of the upsampled signal in an upsampled receiving band corresponding to the reception frequency band, where the upsampled receiving band is distinct from the upsampled transmit band.

The distortion signal is subtracted from the received signal.

The received signal is upsampled to yield an upsampled received signal at the upsampled sampling rate. The reception frequency band corresponds to an upsampled reception band in the upsampled received signal, and the upsampled reception band and the upsampled transmit band in the upsampled transmit and received signals have a same frequency relationship (e.g., frequency offset) as the transmit frequency band and the receive frequency band.

Upsampling the received signal includes introducing a time delay for the upsampled transmit signal relative to the upsampled received signal.

A correlation time between the distortion signal and the received signal is determined, and the time delay for the upsampled received signal is set according to the correlation time.

The reference signal is processed using a non-linear predictor by passing the upsampled transmit signal to a predictor to yield an upsampled distortion signal and the correlation time is determined according to a correlation time between the upsampled distortion signal and the upsampled received signal.

The reference signal is processed using a non-linear predictor by passing the upsampled transmit signal to a configurable predictor configured with predictor parameters.

An upsampled distortion signal is accepted from the configurable predictor, and downsampled retaining the upsampled reception band to yield the distortion signal.

The predictor parameters are determined by setting the parameters to predict the upsampled received signal from the upsampled transmit signal.

The non-linear predictor comprises a time domain non-linear function (e.g., a memory polynomial) that yields each time sample of the upsampled distortion signal as a function of multiple time samples of the upsampled transmit signal.

In another aspect, in general, a signal processing apparatus is used with a transceiver to enhance a received signal based on a signal received at the transceiver in a reception band to remove distortion components of a concurrently transmitted signal transmitted in a transmission band. The apparatus includes a synchronizer configured to accept a reference signal representing a transmit signal and a received signal, and to provide an upsampled transmit signal and an upsampled received signal each sampled at a same sampling rate such that a frequency relationship between the transmission band and the reception band corresponds to a frequency relationship between the upsampled transmit signal and the upsampled received signal. The synchronizer is further configured to apply a delay to synchronize the upsampled received signal and the upsampled transmit signal. The apparatus also includes a canceller including a predictor configured to receive the upsampled transmit signal and the upsampled received signal, to adaptively predict a distortion signal comprising distortion components of the upsampled transmit signal, and to enhance the received signal using the distortion signal.

In another aspect, in general, a non-transitory computer readable medium has a data structure stored thereon. This data structure is operated upon by a program that is executable on a computer system to perform a portion of a process to fabricate an integrated circuit including circuitry described by the data structure. The circuitry described in the data structure includes a signal processor for use with a transceiver to enhance a received signal based on a signal received at the transceiver in a reception band to remove distortion components of a concurrently transmitted signal transmitted in a transmission band. The signal processor includes a synchronizer configured to accept a reference signal representing a transmit signal and a received signal, and to provide an upsampled transmit signal and an upsampled received signal each of which sampled at a same sampling rate such that a frequency relationship between the transmission band and the reception band corresponds to a frequency relationship between the upsampled transmit signal and the upsampled received signal, wherein the synchronizer is further configured to apply a delay to synchronize the upsampled received signal and the upsampled transmit signal. The signal processor also includes a canceller including a predictor configured to receive the upsampled transmit signal and the upsampled received signal, to adaptively predict a distortion signal comprising distortion components of the upsampled transmit signal, and to enhance the received signal using the distortion signal.

One or more aspects provide a technical improvement by enhancing a received signal, which in turn can improve signal-to-noise ratio, reduce error rate in decoding information encoded in the received signal, and/or increase the information rate that can be achieved via the received signal. This improvement is described herein primarily in the context of radio frequency communication (e.g., in a frequency-division duplex system), however it should be understood that similar techniques may be applied in other domains (e.g., optical or acoustic) where distortion components of a transmitted signal "leak" into a received signal.

Other features and advantages of the invention are apparent from the following description, and from the claims.

DESCRIPTION

Figure 1:
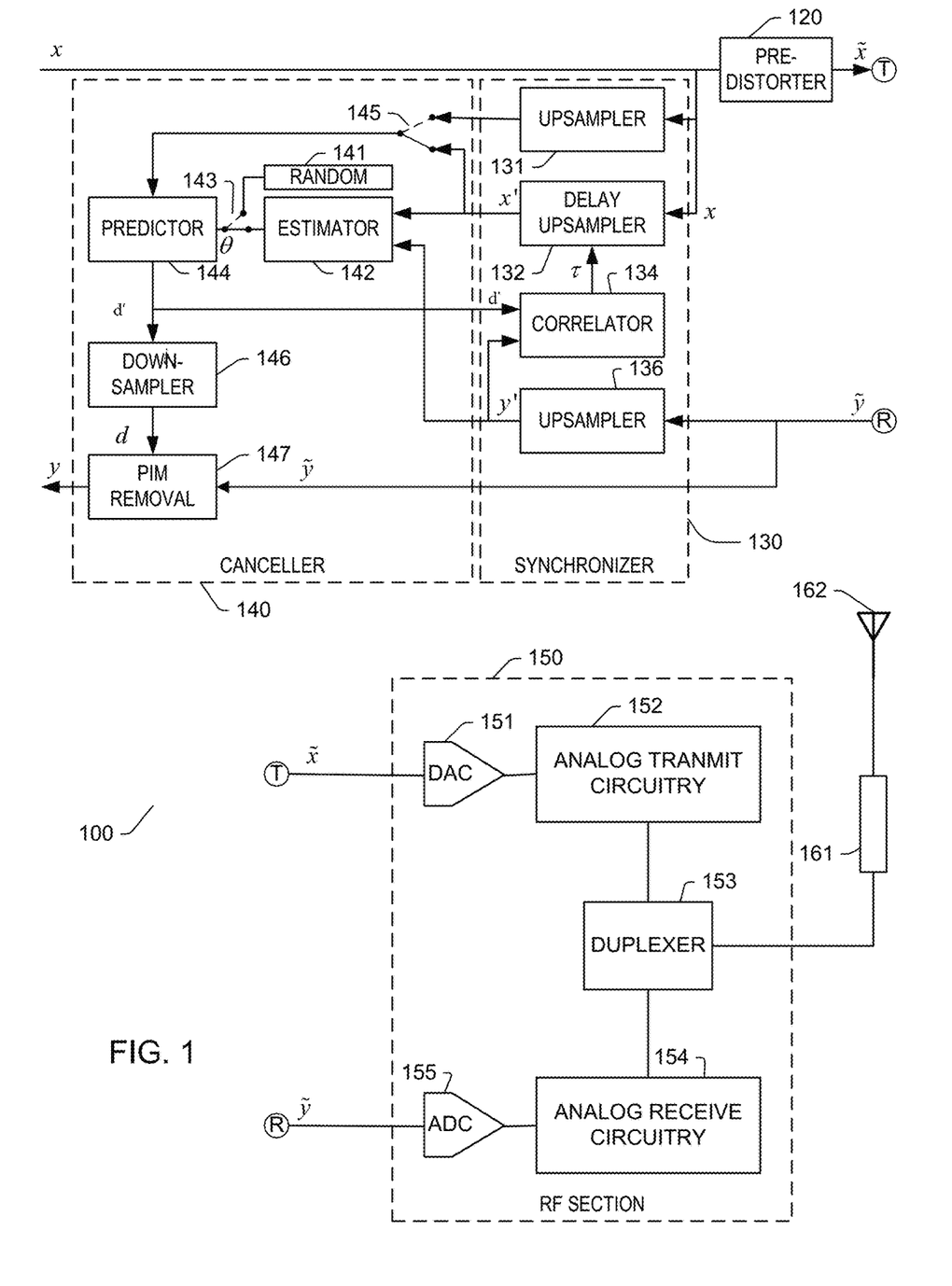
FIG. 1 is a block diagram of a transceiver that incorporates intermodulation distortion cancellation.

Referring to FIG. 1, a transceiver includes a radio frequency (RF) section 150 that receives a digital sampled transmission signal $\tilde{x}$ and provides a digital sampled receive signal $\tilde{y}$, each of these sampled signals being sampled at a sufficient sampling rate for the respective transmit and receive bandwidths. In general, the transmission signal may include separate frequency multiplexed downlink channels for communicating with different terminals, and similarly, the receive signal may include multiple uplink channels transmitted from different terminals. The transmit signal $\tilde{x}$ passes through a digital-to-analog converter (DAC) 151 and analog transmit circuitry 152, which outputs a radio frequency signal with the transmit signal modulated to a radio frequency transmission band. This signal passes via a duplexer 153 to a signal path 161 to an antenna 162 for emission over the air. The antenna 162 also receives signals over the air in a radio frequency reception band that is different than the radio frequency transmission band, and this signal passes via the signal path 161 and duplexer 153 to analog receive circuitry 154 which passes an analog signal to an analog-to-digital converter (ADC) 155, which produces the digital receive signal ŷ.

The analog transmit circuitry generally has non-linear transfer characteristics, and as a result there may be "leakage" of signals outside the specified transmission band. This leakage may be mitigated using an optional predistorter 120, which accepts a desired transmission signal x, and digitally predistorts it, generally, with the goals of achieving an overall linear response within the specified transmission band and minimizing energy outside the specified transmission band, for example, to avoid interference with other transmitters using adjacent transmission bands. An example of a digital predistortion approach is described in U.S. Pat. No. 9,590,668, issued on Mar. 7, 2017, which is incorporated herein by reference.

The radio frequency transmission band is specified to not overlap the receive transmission band. As a result of the concurrent transmission of the provided signal x̃ and reception of the received signal ŷ and sharing of circuit elements of the transmission circuitry and the receiving circuitry (or other coupling between such circuitry), part of the transmission signal x̃ may "leak" into the received signal ŷ. That is, a component of the transmission signal at one frequency within the transmission band may be transformed into a signal component at another frequency in the reception band because of the non-linear characteristics. One phenomenon that causes such leakage is intermodulation distortion by which frequency components at different frequencies in the radio transmission signal may result in interference signals at sum and difference frequencies of the original frequencies and at multiples of those sum and difference frequencies. These intermodulation frequencies may be represented in the received signal ŷ, causing degradation in the receiver characteristics of the transceiver 100.

Continuing to refer to FIG. 1, an approach to mitigating the effect of such intermodulation distortion from the transit signal in the received signal makes use of a digital canceller 140, which is shown as distinct from the optional predistorter 120. Generally, the canceller includes a predictor 144, which produces a distortion signal d (via an upsampled distortion signal d', which is downsampled to produce d) that represents the intermodulation components of the transmit signal x that are predicted to be present in the received signal ŷ. A "PIM" (passive intermodulation distortion) removal component 147 uses the distortion signal d to produce an enhanced received signal y. (Note distortion may be, but is not necessarily, a result of intermodulation distortion, passive effects, etc., and the denotation "PIM" should not be understood to denote any restriction on the types of distortion to which the system is applicable.) The predictor 144 is configured with parameters θ of a non-linear transfer function. The parameters θ are estimated and updated by an estimator 142, which depends on processed (e.g., delayed and/or upsampled) versions of the transmit signal x and receive signal ŷ to match the characteristics of the intermodulation distortion of x found in ŷ.

Generally, one factor that is taken into account is a delay by a delay time τ in the path from the transmit signal x being input (i.e., passed to the predistorter 120 or directly to the RF section 150 if no predistorter is used) and the intermodulation distortion components of that signal appearing in the received signal ŷ. Such delays may be due to digital filtering in the predistorter 120, or analog phase delays introduced in a power amplifier or other components of the analog transmit circuitry 152 or analog receive circuitry 154. Furthermore, the delay time is not necessarily constant. For example, the delay may depend on factors such as the gain settings of amplifiers, which may vary according to automatic gain control functions in the RF section 150. In any case, the delay is not assumed constant and is tracked on an ongoing basis as described further below.

The canceller 140 includes components that operate at an upsampled rate in which an upsampled transmit signal x' is synchronized with an upsampled received signal y', and these upsampled signals are provided to the canceller 140. As described more fully below upsampling and synchronization operations are generally performed in an upsampler/synchronizer 130 of the system, and the results are provided to the canceller 140.

A factor that is taken into account in the upsampler/synchronizer 130 is that x and ŷ are baseband signals (i.e., are substantially near or centered at zero frequency) and are sampled at a sufficient rate to represent the transmit and receive bandwidths, respectively, yet they correspond to different bands in the radio frequency domain (or whatever frequency domain the signal are coupled in, for example, in an intermediate frequency domain). For example, if the transmit bandwidth in the radio frequency domain is 75 MHz (from 1805 MHz to 1880 MHz) and the receive bandwidth in the radio frequency domain is 75 MHz (from 1710 MHz to 1785 MHz), then the sampling rates are at least 150 M-samples/sec and 150 M-samples/sec., respectively (i.e., at least the Nyquist sampling rate). In order to capture the nonlinear transfer characteristics from x to ŷ, the system uses a continuous bandwidth (referred to herein as an upsampled bandwidth) that covers these two bands, and generally including any frequency range between these two bands. For example, if the radio transmission band is at a higher frequency than the radio reception band, and if the transmission band has a higher frequency at 1880 MHz and the reception band has an lower frequency at 1710 MHz, then the system represents the transmit and receive signals within the combined upsampled band of bandwidth 170 MHz at a sampling rate of at least 340 M-samples/sec. Note that if the radio transmit and receive bands are more widely separated, the upsampled rate would have to be higher to accommodate the wider upsampled bandwidth. The upsampled versions of signals x and ŷ are denoted x' and y', respectively. Furthermore, the upsampled transmit signal x' is delay adjusted so that it is time-synchronized with y' using a procedure described fully below.

Figure 2:
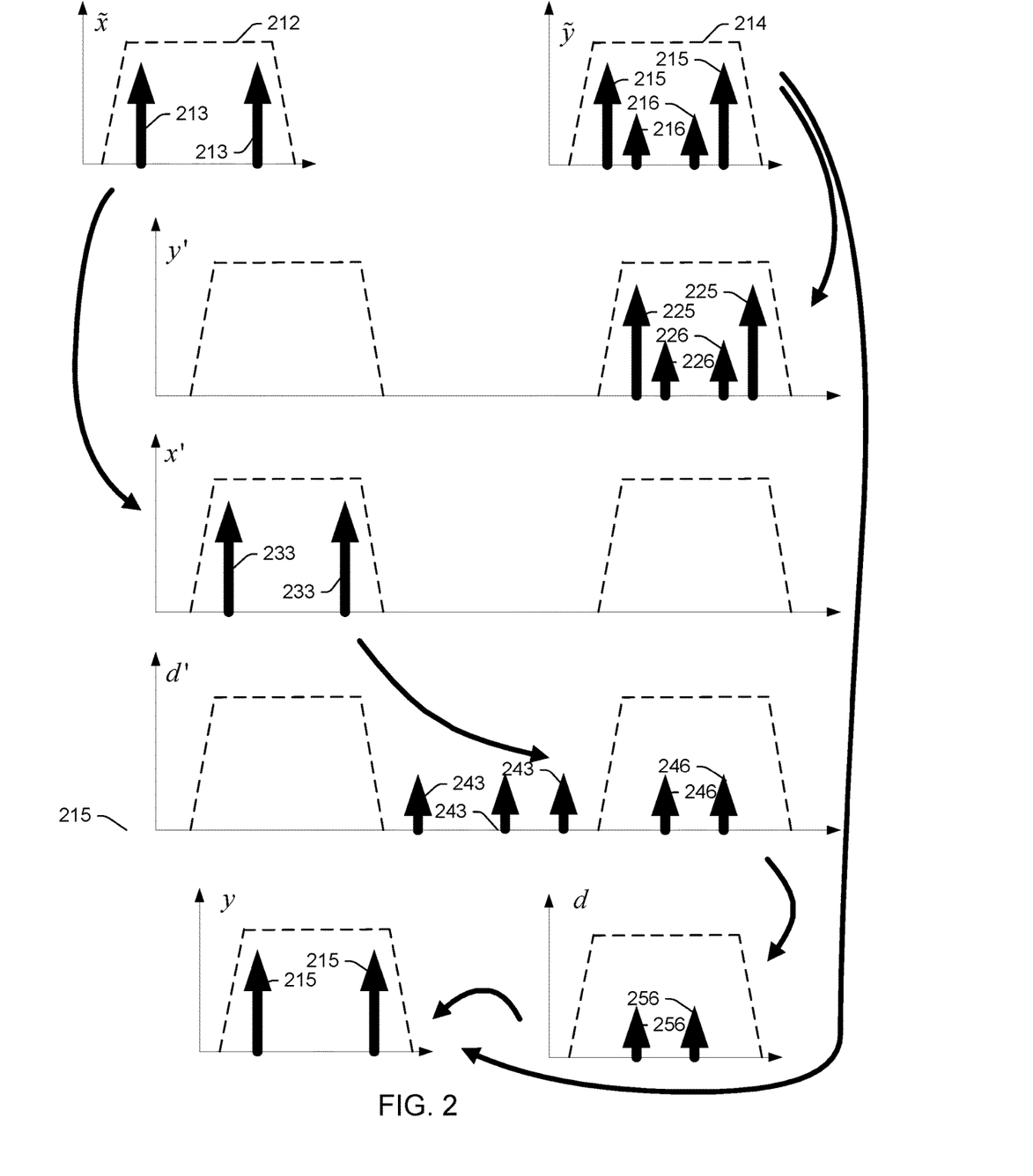
FIG. 2 is a series of frequency domain schematic drawings showing signal components of signals referenced in FIG. 1.

Continuing to refer to FIG. 1, and also referring to FIG. 2 in which the signals are labelled consistently with FIG. 1, a schematic example of a transmit signal x is shown in FIG. 2a in the baseband frequency domain with two signal components 213 within a transmit bandwidth 212. Similarly, a schematic example of a receive signals ŷ is shown in FIG. 2b in the baseband frequency domain within a receive bandwidth 214, and includes two receive components 215 as well as two intermodulation components 216, which result from the transmit components 213 passing through the RF section 150.

As introduced above, both the input signal x and the received signal ŷ are upsampled as x' and y', respectively, which are shown in the upsampled frequency band in FIGS. 2d and 2c, respectively. The input signal is upsampled by an upsampler 131, which is used during initialization, or an upsampler 132, which is used during further operation. In the case of the upsampler 132, the upsampler also implements a delay of the signal by a time τ, which is computed by a correlator 134 as described further below. Note that the upsampler 136, which transforms ŷ to the upsampled version y', frequency shifts the components 215-216 to yield shifted components 225-226 in the upsampled signal so that they are correctly spaced from the components 233 in the upsampled input signal. Note that in this example, the transmission band is at a lower frequency than the reception band. In the opposite case in which the transmit band is at a higher frequency than the receive band, the upsampler 136 does not necessarily frequency shift the signal, and the upsampler 131 and 132 shift the input signal in a similar manner.

In normal operation, the upsampled input signal x' passes to a predictor 144, which is configured with a set of parameters θ to output an upsampled predicted distortion signal d', also at an upsampled rate. A schematic example of a resulting distortion signal is shown in the frequency domain in FIG. 2e. Note that some components (e.g., components 246) of the distortion signal fall in the upsampled reception band, while there may be other components (e.g., components 243) that fall outside the upsampled reception band.

The upsampled distortion signal d' is downsampled by a downsampler 146 to the sampling rate of the receive signal ỹ retaining the part of the upsampled distortion signal that corresponds to the receive band producing a distortion signal d, which has baseband distortion components 256. Finally, this baseband distortion signal is used by the PIM remover 147 to subtract the predicted distortion components 256 from the received signal, ideally completely removing the components 216 of the received signal to produce the enhanced signal y, which retains the signal components 215, which were received over the air.

As introduced above, the upsampler 132, is responsive to a delay input τ to compensate for the delay of the distortion components of the input signal through the RF section 150. This delay value is determined by a correlator 134, which receives the predicted distortion signal d' and the upsampled received signal y'. The correlator 134 essentially performs a cross-correlation of its input signals to determine the delay τ at which the input signals are most correlated. This correlation essentially results from the correlation of the actual distortion components 226 and the predicted distortion components 246 that are in the receive frequency band.

During an initialization period (or a resynchronization period when the synchronization is lost), a selector 145 passed an undelayed (or delayed by a default time) input signal from the upsampler 131 to the predictor 144. This permits the correlator 134 to establish a new estimate for the time delay τ, at which point the selector 145 switches again to use the output of the delay upsampler 132.

The parameters θ for the upsampler are determined by an estimator 142, which receives the upsampled input signal x' and the upsampled received signal y' and optimizes the parameters predict as much of y' as possible from x'. For example, the predictor makes use of a memory polynomial and the parameters are coefficients of the polynomial and the parameters are adapted using a gradient-based or least-squared error procedure. During initialization, a random set of parameters 141 are selected by a selector 143 rather than the output of the estimator 142, in order that the predicted distortion has at least some components that may correlate with the received signal in order to obtain a reasonable initial estimate of the delay τ.

Figure 3:
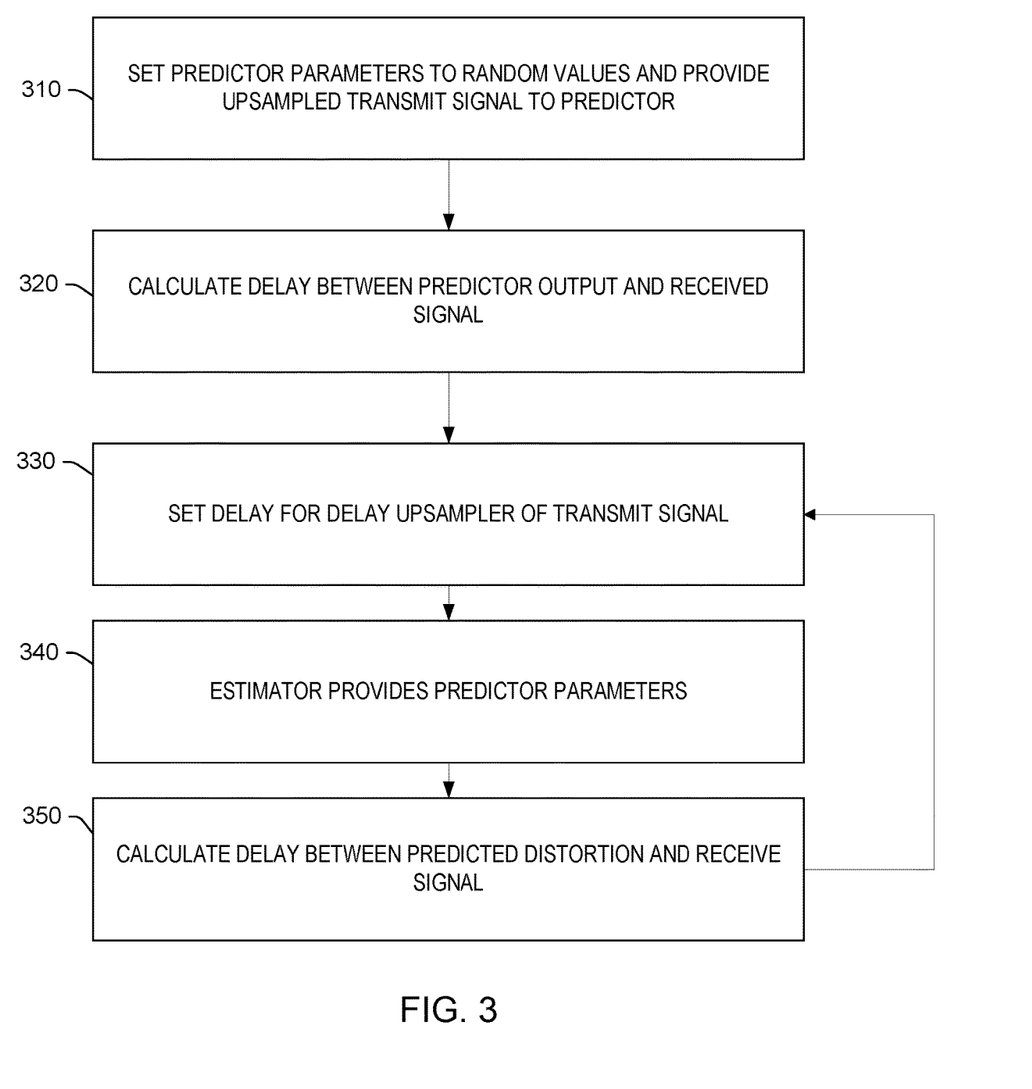
FIG. 3 is a flowchart of a synchronization procedure.

Referring to the flowchart of FIG. 3 a procedure described above may be summarized in the flowchart. At step 310, the predictor 144 receives random parameters 141 via a switch 143, and receives an upsampled transmit signal via the upsampler 131 and a switch 145. At step 320, the predictor 144 provides a distortion output which is used by the correlator 134 to determine a delay time. At step 330, the determined delay time is used to configure the delay upsampler 132 for the transmit signal. At step 340, the estimator 142 provides estimated parameters to the predictor 144 via the switch 143. At step 350, the delay time is again computed.

Embodiments described above address a situation in which distortion in the received baseband signal ỹ is "self-inflicted" in that the distortion components originate from a signal x that is transmitted from the same transceiver. In other embodiments, distortion terms originate from a radio signal transmitted from another transmitter. Although the other transmitter may transmit in another radio transmission band that is not supposed to interfere with the radio reception band from which ỹ is obtained via the analog receive circuitry shown in FIG. 1, that other transmitter may produce distortion components that impinge on the radio reception band, or such distortion components may result during propagation and reflection from the other transmitter to the receiver. Unlike the case in which the transceiver has a reference x for the transmitted signal, the transceiver would not in general have a reference for the other transmitted signal. In general, an approach to compensating for the distortion components originating from the other transmitter is to (1) locally generate a baseband reference signal s, and (2) remove distortion components of s in ỹ in essentially the same manner that distortion components of x are removed from ỹ in embodiments described above.

Figure 4:
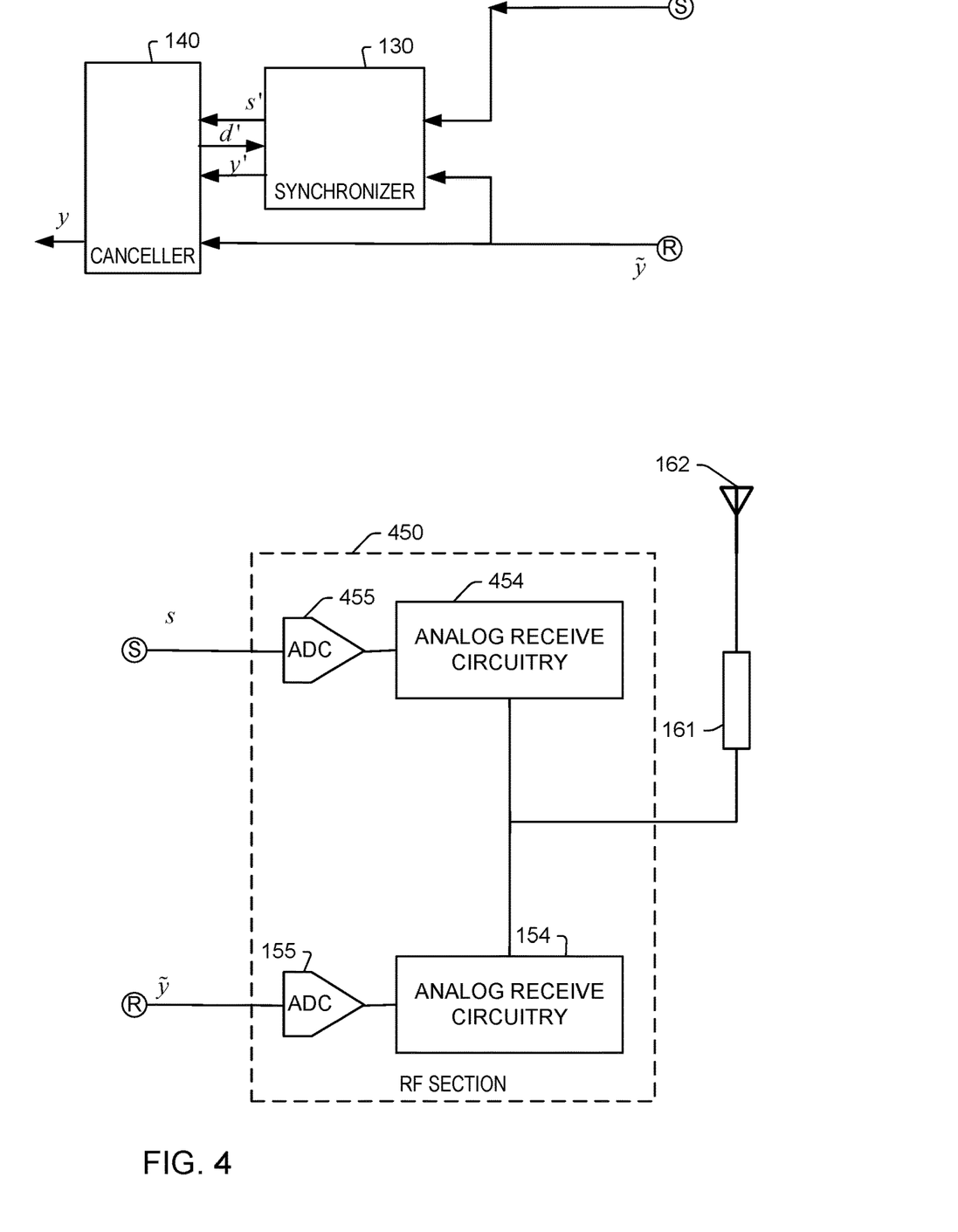
FIG. 4 is a block diagram of a receiver section that incorporates distortion cancellation from another transmitter.

Referring to FIG. 4, in an embodiment that cancels such "involuntary" distortion, an RF section 450 includes two receiver sections. Analog receive circuitry 154, tuned to the radio receive band, and an analog-to-digital converter (ADC) 155 yield the baseband receive signal ỹ, and a second analog receive circuitry 454, tuned to the other transmitter's radio transmit band, and another ADC 455 yield a baseband reference signal s. For example, the receive circuitry 154 yielding may be tuned to a channel at 1.8 GHz, and the receive circuitry 454 may be tuned to the channel at 2.1 GHz being used by the other transmitter.

Continuing to refer to FIG. 4, a synchronizer 130 synchronizes and upsamples s and ỹ to yield an upsampled reference/transmit signals s' and an upsampled receive signal y', and these upsampled signals are provided to a canceller 140, which removes distrortion components of s from ỹ by first generating the upsampled distortion signal d' from which a baseband distortion signal d is obtained and used to yield the enhanced signal y.

Note that multiple sensed signals s, of the transmit signal x and one or more sensed signals s, may be used, for example, by successively or jointly subtracting the predicted distortion component from each sensed signal. In some embodiments, all the sensed signals and the received signal ỹ are upsampled to a common sampling rate, and the successive distortion predictions are subtracted in the upsampled domain.

In some embodiments, the reference signal may be associated with distortion components in only part of the receive band, or only some distortion components within the receive band are significant enough to warrant cancellation. In such situations, rather than upsampling the reference signal to a bandwidth sufficient to cover the entire receive bandwidth, the sensed bandwidth, and the spectral gap between them, a smaller bandwidth that covers only part of the receive bandwidth (as well as the sensed bandwidth and the spectral gap) may be used. Upsampling the receive signal effectively discards the portion of the receive bandwidth other than the part from which distortion components are to be subtracted. Correspondingly, downsampling the distortion signal d' maps the baseband distortion signal d to the appropriate part of the receive bandwidth. This approach of using a reduced upsampled bandwidth may reduce the computation required when the effect of the distortion components of a remote transmitter are particularly concentrated within the receive band. Furthermore, the sensing of the remote transmission may concentrate on a particular part of the remote transmitters transmission bad without necessarily sensing transmission at frequencies that do not impart distortion components in the receive band.

Figure 5:
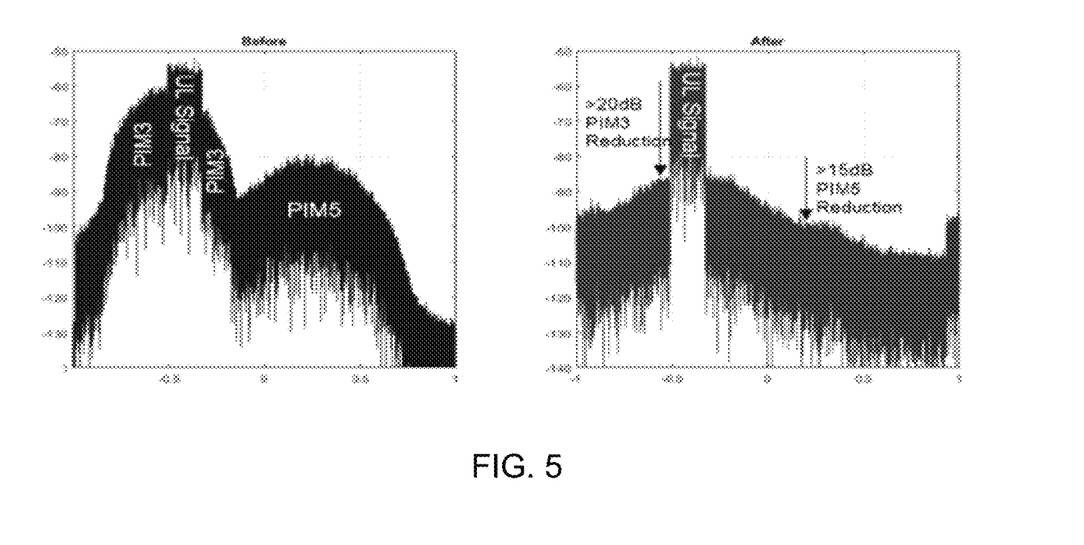
FIG. 5 is a frequency domain plot of a received signal prior to and after distortion cancellation.

Referring to FIG. 5, including plot of a received signal, denoted as UL (uplink) signal, translated in baseband versus frequency (in baseband), before use of the cancellation approach on the left and after use of the procedure on the right The baseband frequency of −1 to 1 corresponds to the Nyquist frequency of ADC. The location of the received signal is at −0.5 and −0.3 of Nyquist frequency. PIM3 before cancellation is shown at −0.8 to −0.2 (overlapping with the UL signal), and PIM5 at −0.2 to +0.4 of the Nyquist frequency, respectively.

Figure 6:
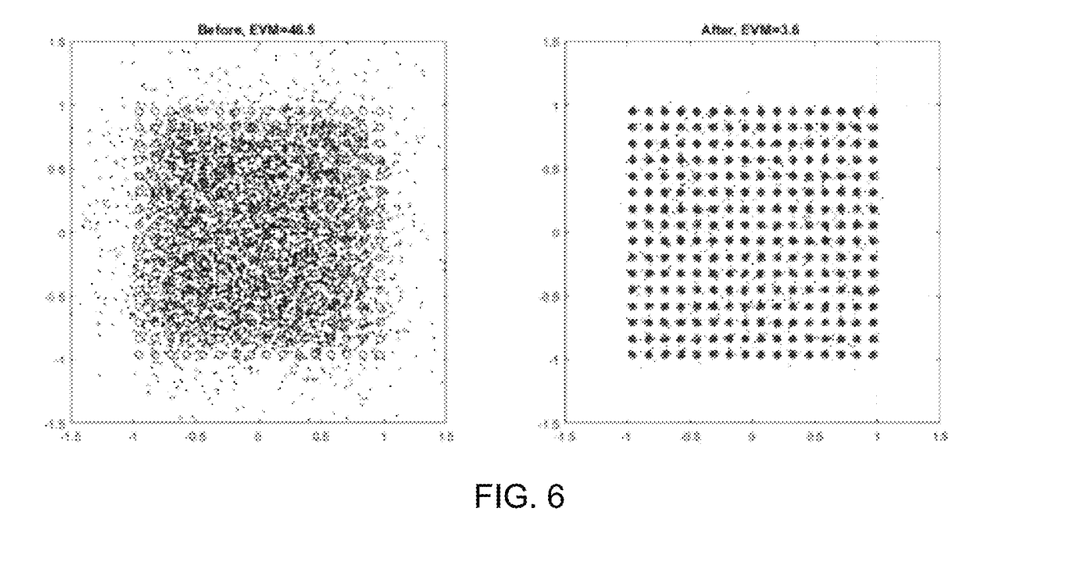
FIG. 6 is a constellation plot of the received signal prior to and after distortion cancellation.

Referring to FIG. 6, constellation plots for an error vector magnitude (EVM) of received, demodulated 256 quadrature amplitude modulation (QAM)1 is shown without the processing on the left, and with the processing on the right. EVM is an effective measure of a quality of received signal. An improvement of a factor of 13 is shown in this measured example. It should be evident from the figure that the processing provides greatly reduced leakage and intermodulation in the receiver band and restores the signal link.

In some implementations, a system including the canceller 140 and/or the synchronizer 130 is implemented in hardware, in software, or in a combination of hardware or software. The hardware may include Application Specific Integrated Circuits (ASICs), Field Programmable Gate Arrays (FPGAs), and the like. Software implementations may include instructions stored on a non-transitory machine-readable medium such that when executed by a processor (e.g., a digital signal processor, special purpose controller, etc.) causes the processor to perform procedures described above. As an example, the predictor 144 and correlator 134 may be implemented in ASICs, and the estimator may be implemented in software within the same system.

In some implementations, a computer accessible non-transitory storage medium includes a database representative of a system including some or all of the components of the canceller 140 and/or the synchronizer 130. Generally speaking, a computer accessible storage medium may include any non-transitory storage media accessible by a computer during use to provide instructions and/or data to the computer. For example, a computer accessible storage medium may include storage media such as magnetic or optical disks and semiconductor memories. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

It is to be understood that the foregoing description is intended to illustrate and not to limit the scope of the invention, which is defined by the scope of the appended claims. Other embodiments are within the scope of the following claims.

What is claimed is:

1. A method for enhancing a received signal to remove distortion components of a concurrently transmitted signal, the method comprising:
   receiving the received signal, comprising multiple received signal components in multiple frequency receive channels, with the received signal acquired concurrently with transmission of a transmit signal comprising multiple transmit signal components in multiple frequency transmit channels, wherein the received signal includes a distortion component of the transmit signal;
   processing a reference signal representing the transmit signal using a non-linear predictor to output a distortion signal comprising a predicted distortion component corresponding to the transmit signal comprising the multiple transmit signal components in the multiple frequency transmit channels;
   enhancing the received signal to yield an enhanced received signal using the distortion signal by removing at least some of the distortion component of the transmit signal from the received signal according to the predicted distortion component; and
   providing the enhanced received signal.

2. The method of claim 1 further comprising:
   providing the reference signal for causing transmission of the transmit signal in a transmission frequency band.

3. The method of claim 2 wherein transmission of the transmit signal is via transmission circuitry and wherein the received signal is received via first receiving circuitry that is coupled to or that shares elements with the transmission circuitry.

4. The method of claim 1 further comprising:
   receiving the reference signal via second receiving circuitry based on a propagation of the transmit signal.

5. The method of claim 4 further comprising:
   downsampling the upsampled distortion signal to yield the distortion signal retaining a part of the up sampled signal in an upsampled receiving band corresponding the reception frequency band, the upsampled receiving band being distinct from the upsampled transmit band.

6. The method of claim 5 wherein enhancing the received signal comprises subtracting the distortion signal from the received signal.

7. The method of claim 1 wherein processing the reference signal comprises:
   upsampling the reference signal to yield an upsampled transmit signal at an upsampled sampling rate, the transmit frequency band corresponding to an upsampled transmit band in the upsampled transmit signal; and
   passing the upsampled transmit signal to a configurable predictor configured with predictor parameters, the configurable predictor providing an upsampled distortion signal determined from the upsampled transmit signal as input.

8. The method of claim 1 further comprising:
upsampling the reference signal to yield an upsampled transmit signal at an upsampled sampling rate, the transmit frequency band corresponding to an upsampled transmit band in the upsampled transmit signal;
upsampling the received signal to yield an upsampled received signal at the upsampled sampling rate, the reception frequency band corresponding to an upsampled reception band in the upsampled received signal, wherein the upsampled reception band and the upsampled transmit band in the upsampled transmit signal have a same frequency relationship as the transmit frequency band and the receive frequency band.

9. The method of claim 8 wherein up sampling the reference signal includes introducing a time delay of the upsampled transmit signal relative to the upsampled received signal.

10. The method of claim 9 further comprising:
determining a correlation time between the distortion signal and the received signal; and
setting the time delay for the upsampled received signal according to the correlation time.

11. The method of claim 10 wherein processing the reference signal using a non-linear predictor comprises passing the upsampled transmit signal to a predictor to yield an upsampled distortion signal, and determining the correlation time comprises determining a correlation time between the upsampled distortion signal and the upsampled received signal.

12. The method of claim 8 wherein processing the reference signal using a non-linear predictor comprises passing the upsampled transmit signal to a configurable predictor configured with predictor parameters.

13. The method of claim 12 wherein processing the reference signal further comprises accepting an upsampled distortion signal from the configurable predictor, and downsampling the upsampled distortion signal retaining the upsampled reception band to yield the distortion signal.

14. The method of claim 12 further comprising determining the predictor parameters comprises setting the parameters to predict the upsampled received signal from the upsampled transmit signal.

15. The method of claim 12 wherein the non-linear predictor comprises a time domain non-linear function that yields a time sample of the upsampled distortion signal as a function of multiple time samples of the upsampled transmit signal.

16. The method of claim 1, wherein the distortion component comprises multiple intermodulation distortion components resulting from non-linear effects, caused by transmission and receive circuitry in a device, on the multiple transmit signal components in the multiple frequency transmit channels, the non-linear effects causing the leakage of the multiple intermodulation distortion components into the received signal, wherein the transmission and receive circuitry in the device is configured to transmit the multiple transmit signal components in the multiple frequency transmit channels and concurrently receive the multiple received signal components in the multiple frequency receive channels, the device comprising at least one antenna coupled to the transmission and received circuitry.

17. The method of claim 1, further comprising:
estimating updateable parameters of a predictor, configured to generate the predicted distortion component, based on the received signal comprising multiple received signal components in multiple frequency receive channels and the transmit signal comprising the multiple transmit signal components in the multiple frequency transmit channels.

18. A method for enhancing a received signal to remove distortion components of a concurrently transmitted signal, the method comprising:
receiving the received signal acquired in a reception frequency band concurrently with transmission of a transmit signal in a transmission frequency band, wherein the received signal includes a distortion component of the transmit signal;
processing a reference signal representing the transmit signal using a non-linear predictor to output a distortion signal comprising a predicted distortion component corresponding to the transmit signal;
enhancing the received signal to yield an enhanced received signal using the distortion signal by removing at least some of the distortion component of the transmit signal from the received signal according to the predicted distortion component; and
providing the enhanced received signal;
wherein the method further comprises providing the reference signal for causing transmission of the transmit signal in a transmission frequency band, wherein transmission of the transmit signal is via transmission circuitry and wherein the received signal is received via first receiving circuitry that is coupled to or that shares elements with the transmission circuitry, and wherein the transmission circuitry and the receiving circuitry share a passive element.

19. A signal processing apparatus for use with a transceiver to enhance a signal received at the transceiver in a reception band to remove distortion components of a concurrently transmitted signal in a transmission band, the apparatus comprising:
a synchronizer configured to accept a reference signal representing a transmit signal comprising multiple transmit signal components in multiple frequency transmit channels, and a received signal comprising multiple received signal components in multiple frequency receive channels, and to provide an upsampled transmit signal and an upsampled received signal each sampled at a same sampling rate such that a frequency relationship between the transmission band and the reception band corresponds to a frequency relationship between the upsampled transmit signal and the upsampled received signal, wherein the synchronizer is further configured to apply a delay to synchronize the upsampled received signal and the upsampled transmit signal; and
a canceller including a predictor configured to receive the upsampled transmit signal generated from the transmit signal comprising the multiple transmit signal components in the multiple frequency transmit channels, and the upsampled received signal generated from the received signal comprising the multiple transmit signal components in the multiple frequency transmit channels, to adaptively predict a distortion signal comprising distortion components of upsampled transmit signal, and to enhance the received signal using the distortion signal.

20. The apparatus of claim 19, wherein the distortion component comprises multiple intermodulation distortion components resulting from non-linear effects, caused by transmission and receive circuitry of the transceiver, on the multiple transmit signal components in the multiple frequency transmit channels, the non-linear effects causing the leakage of the multiple intermodulation distortion components into the received signal, wherein the transmission and receive circuitry of the transceiver is configured to transmit the multiple transmit signal components in the multiple frequency transmit channels and concurrently receive the multiple received signal components in the multiple frequency receive channels, the transceiver comprising at least one antenna coupled to the transmission and received circuitry.

21. The apparatus of claim 19, further comprising:
an estimator to estimate updateable parameters of the predictor, configured to generate the predicted distortion signal, based on the received signal comprising the multiple received signal components in the multiple frequency receive channels and the transmit signal comprising the multiple transmit signal components in the multiple frequency transmit channels.

22. A non-transitory computer readable medium storing a data structure which is operated upon by a program executable on a computer system, the program operating on the data structure to perform a portion of a process to fabricate an integrated circuit including circuitry described by the data structure, the circuitry described in the data structure including a signal processor for use with a transceiver to enhance a signal received at the transceiver in a reception band to remove distortion components of a concurrently transmitted signal transmitted from the transceiver in a transmission band, the signal processor comprising:

a synchronizer configured to accept a reference signal representing a transmit signal comprising multiple transmit signal components in multiple frequency transmit channels, and a received signal comprising multiple received signal components in multiple frequency receive channels, and to provide an upsampled transmit signal and an upsampled received signal each sampled at a same sampling rate such that a frequency relationship between the transmission band and the reception band corresponds to a frequency relationship between the upsampled transmit signal and the upsampled received signal, wherein the synchronizer is further configured to apply a delay to synchronize the upsampled received signal and the upsampled transmit signal; and a canceller including a predictor configured to receive the upsampled transmit signal generated from the transmit signal comprising the multiple transmit signal components in the multiple frequency transmit channels and the upsampled received signal generated from the received signal comprising the multiple received signal components in the multiple frequency receive channels, to adaptively predict a distortion signal comprising distortion components of upsampled transmit signal, and to enhance the received signal using the distortion signal.

\* \* \* \* \*